United States Patent

[11] 3,616,221

| | | | |
|---|---|---|---|
| [72] | Inventors | Yoshiyuki Takasaki;<br>Osamu Tanabe, both of Chiba-shi, Japan | |
| [21] | Appl. No. | 805,072 | |
| [22] | Filed | Jan. 2, 1969 | |
| [45] | Patented | Oct. 26, 1971 | |
| [73] | Assignee | The Agency of Industrial Science and Technology<br>Tokyo, Japan | |
| [32] | Priority | May 11, 1965 | |
| [33] | | Japan | |
| [31] | | 40/27525 | |
| | | Continuation-in-part of application Ser. No. 498,980, Oct. 20, 1965, now abandoned. | |

[51] Int. Cl.............................................. C12d 1/00
[50] Field of Search............................... 195/31, 66; 99/142

[56] References Cited
OTHER REFERENCES
Tsumura et al., Agr. Biol. Chem. Vol. 25 No. 8 Pages 616–619 (1961)

*Primary Examiner*—Alvin E. Tanenhultz
*Attorney*—Ernest G. Montague

[54] ENZYMA METHOD FOR CONVERTING GLUCOSE IN GLUCOSE SYRUPS TO FRUCTOSE
13 Claims, 1 Drawing Fig.

[52] U.S. Cl...................................................... 195/31,
195/80, 195/66, 99/142

ABSTRACT: Glucose in a glucose syrup is transformed into fructose, in high yields, by reaction with glucose isomerizing enzyme derived from micro-organisms which are characterized as having the ability to assimilate xylan to produce a glucose isomerizing enzyme.

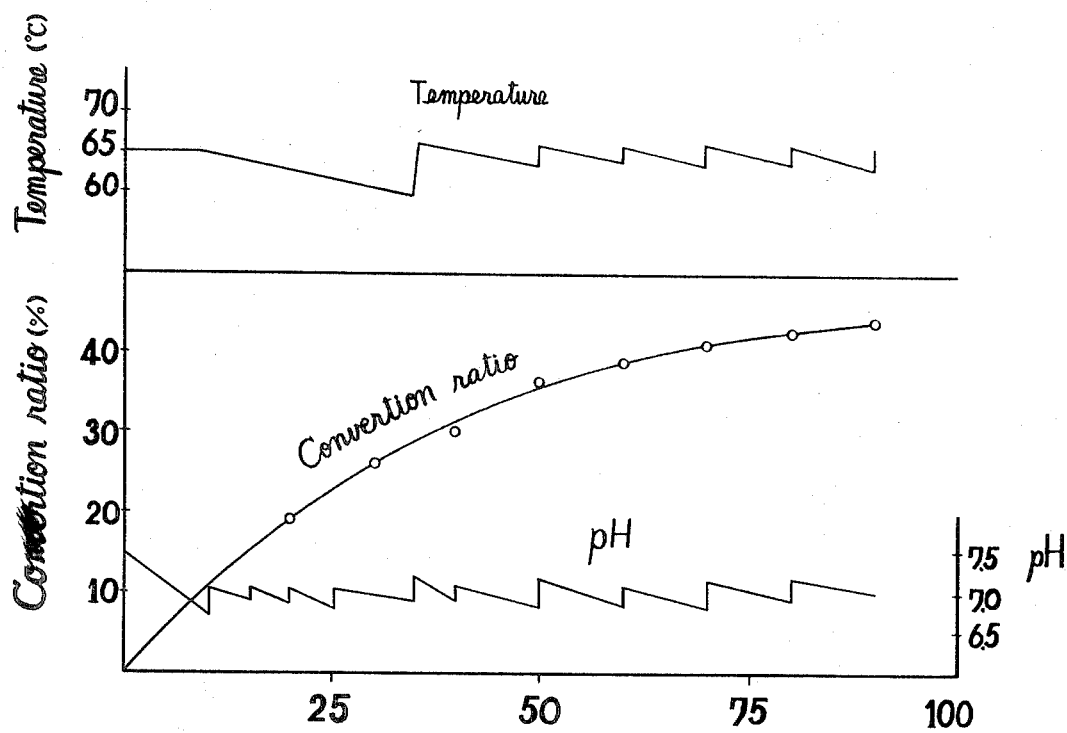

ENZYMA METHOD FOR CONVERTING GLUCOSE IN GLUCOSE SYRUPS TO FRUCTOSE

CROSS-REFERENCE

This application is a continuation-in-part application of copending application Ser. No. 498,980, filed Oct. 20, 1965 and now abandoned.

BACKGROUND OF THE INVENTION

An alkaline method and also an enzyme method for converting glucose into fructose, are known. Both of these methods have practical disadvantages. The former method involves losses caused by decomposition of glucose. In the latter method in order to obtain suitable quantities of isomerizing enzyme from the micro-organisms, it is required that the micro-organisms be grown in a medium containing as a carbon source D-xylose, a relatively expensive material.

SUMMARY OF THE INVENTION

The present invention provides a method for converting glucose into fructose by reacting the glucose with a glucose isomerizing enzyme which is derived from micro-organisms which are characterized as having the ability to assimilate xylan to produce a glucose isomerizing enzyme. The enzyme is produced by cultivating the parent micro-organism in a medium containing (i) xylan, or (ii) plant materials which contain xylan.

Certain micro-organisms of the Streptomyces genus produce the glucose isomerizing enzyme. The group producing glucose isomerizing enzyme includes *Streptomyces flavovirens* ATCC No. 3320, *Streptomyces achromogenus* ATCC No. 12767, *Streptomyces echinatus* ATCC No. 21133, *Streptomyces wedmorensis* ATCC No. 21230, and *Streptomyces albus* ATCC No. 21132.

The Streptomyces micro-organisms, such as *Streptomyces wedmorensis*, may be grown in a medium containing plant materials having available xylan, such as straw, wheat, bran, corn cobs, corn husks, rice bran, pulp waste, etc. and produces glucose isomerase. It is more economical to use a xylan-containing medium to cultivate the Streptomyces micro-organisms which form glucose isomerizing enzymes, than to use a medium which contains as the principal carbon source D-xylose.

BRIEF DESCRIPTION OF THE DRAWING

The FIGURE contains two graphs in which are plotted the temperature and pH values in the process of example 9, together with the percentage conversion of glucose to fructose.

DESCRIPTION OF THE PREFERRED EMBODIMENTS

Xylan is mainly made up of xylose units. Xylan is a principal component of hemicellulose which is present in virtually all land plants. D-xylose is manufactured commercially by acid hydrolysis of xylan. Previous glucose isomerization processes which have utilized enzymes to convert glucose to fructose derived the enzymes from micro-organisms grown in a medium containing xylose.

The present inventors discovered that some kinds of micro-organisms which are characterized as having the ability to assimilate xylan also produce glucose isomerizing enzyme. Characterization of the micro-organisms as having the ability to assimilate xylan to produce a glucose isomerizing enzyme is only done for the purposes of the present invention to differentiate these micro-organisms from others which may also produce a glucose isomerizing enzyme, but will not do so when the principal carbon source in the growth medium is xylan. Glucose isomerizing enzyme may be derived from the micro-organisms of this invention by cultivating the same in a medium containing, for instance D-xylose, but it is preferred, because of economics, that the micro-organisms be cultivated in a medium containing xylan or plant materials containing xylan.

The glucose isomerizing enzymes are prepared by cultivating the Streptomyces organisms in an aqueous medium, such as those disclosed in the examples. At the completion of cultivation, the cellular material which may be used as the enzyme source is separated from the supernatant liquid. The glucose is transformed to fructose by incubating a glucose solution with the enzyme. The enzyme has superior characteristics for use in commercial processes since it is active over a wide pH range, temperature range and range of glucose concentration. If desired the process may be operated to convert up to about 50% of the initial glucose into fructose. This produces a syrup having substantially the sweetness characteristics of invert syrup.

The isomerization may be carried out at a pH of between about 5.5 and about 8, and preferably between about 6.8 and about 7.2, with 7 being the preferred. The reaction temperature may be between about 45° C. and 80° C., with a preferred range of between about 60° C. and 70° C. The derivation of these ranges is illustrated in the examples.

The preferred Streptomyces species are *Streptomyces wedmorensis* ATCC No. 21230 and *Streptomyces albus* ATCC No. 21132. These are newly isolated strains with the following characteristics and morphology:

*Streptomyces wedmorensis* ATCC No. 21230 - Morphology
Morphology; Spores spherical to oval.
Sucrose nitrate agar: Aerial mycelium white to gray. No soluble pigment.
Potato; Growth slow. Aerial mycelium white to gray.
Gelatin; Liquefaction. No soluble pigment.
Milk: Slow coagulation and peptonization.
Starch agar: Hydrolysis. Good growth. Aerial mycelium white.

Nitrate reduction: Positive.
Glucose asparagine agar: Substrate growth colorless to yellow. Aerial mycelium white. No soluble pigment.
Tyrosinase reaction: Negative.
Maintenance: The preferred growth medium follows: 10 g. of D-xylose, 10 g. of polypeptone, 3 g. of $K_2HPO_4$, 1 g. of $MgSO_4 \cdot 7H_2O$, and 1 liter of distilled water. The culture should be transplanted every 3 months. The culture may be stored at 10° C.

*Streptomyces albus* ATCC No. 21132 (YT No. 5)—Morphology
Morphology: Sporophores spiral. Spores spherical to oval, spiny.
Nutrient agar: Good growth, colorless to yellowish. No soluble pigment.
Aerial mycelium abundant, white.
Sucrose nitrate agar: Growth smooth, colorless. Aerial mycelium white to gray.
Glucose asparagine agar: Substrate growth colorless to yellowish. Aerial mycelium white. No soluble pigment.
Gelatin: Liquefaction. No soluble pigment.
Milk: Aerial mycelium white. Coagulation. Peptonization.
Starch agar: Good growth. Aerial mycelium abundant, white. No soluble pigment.
Odor: Moldy.
Habitat: Soil
Maintenance: The preferred growth medium follows: 10 g. of D-xylose, 10 g. of polypeptone, 3 g. of $K_2HPO_4$, 1 g. of $MgSO_4 \cdot 7H_2O$, and 1 liter of distilled water. The culture should be transplanted every 3 months. The culture may be stored at 10° C.

The following examples are further illustrated of this invention, and it will be understood that the invention is not limited thereto.

EXAMPLE 1

*Streptomyces wedmorensis* ATCC No. 21230 was inoculated into a presterilized medium (400 ml.), consisting of 3% wheat bran (containing 21 percent xylan), 4% corn steep liquor, 0.1% of $MgSO_4 \cdot 7H_2O$, and 0.3% NaCl and cultivated at 30° C., for 20–30 hours, with shaking. Seed obtained from the foregoing was transplanted into 10 l. of a medium consisting of the foregoing composition, and cultivated with aeration in a Jar-fermentor (aeration rate 7.5 l./min. 200 r.p.m., 30° C). The activity of the glucose isomerizing enzyme in the cell reached a maximum within 20-25 hours.

An assay of the activity of the glucose isomerizing enzyme was carried out in the following reaction mixture:

0.2 M phosphate buffer solution (pH 7.5)—0.5 ml.
1 M glucose solution—0.2 ml.
0.1 M $MgSO_4·7H_2O$ solution—0.1 ml.
Enzyme solution—0.2-0.3 ml.

The foregoing was made up to 2 ml. total volume with water and incubated at 70° C. for 1 hour. The reaction was stopped by adding 2 ml. of 0.5 M perchloric acid. The fructose was determined by the cysteine-carbazole method. The amount of enzyme necessary to produce 1 mg. of fructose from glucose per hour at 70° C. under the above assay conditions, was defined as a unit of the enzyme.

Cell material, was centrifugally collected from 50 ml. of the cultivating solution above, was washed with water, suspended in water and treated by sonic oscillation for 15 minutes at 10 kc. After the sonic treatment, 30 ml. of supernatant was obtained and used as the enzyme source. The enzyme activity was 623 units.

To said enzyme solution was then added 50 g. of glucose, 5 ml. of 0.1 M $MgSO_4·7H_2O$, 25 ml. of 0.2 M phosphate buffer solution (pH 7.5), and water. The total volume was made up to 100 ml. with water. Said mixture was incubated at 65° C. for 50 hours while maintaining the pH of the same between 6.8-7.2 during the reaction. At the completion of the reaction, precipitate was removed by centrifugation and the supernatant liquid was treated with an ion exchange resin, to remove inorganic salt and protein, and was then vacuum evaporated. A transparent sweet syrup consisting of 54% glucose and 46% fructose was obtained. From said mixture, using the conventional method, complexes of fructose and calcium were separated by adding milk of lime. The fructose obtained was further decolorized, and crystallized after concentration by decreasing the pressure to remove solvent. Eleven grams of the fructose was obtained.

The product was analyzed for fructose by paper chromatography using phenol: water (4:1), or pyridine:butanol:water (4:6:3) as solvents. Resorcinol reagent, which produces a red coloration specific for ketohexoses was employed as the identification agent. From the foregoing, it was determined that the RF value exactly corresponds to the RF value of standard fructose. The rotary polarization of a solution of the product was also exactly equal to the value of a standard fructose solution.

EXAMPLE 2

In this example, pure xylan was used as the carbon source of the medium and *Streptomyces flavovirens* ATCC No. 3320, *Streptomyces achromogenus* AtCC No. 12767, *Streptomyces echinatus* ATCC No. 21133, and *Streptomyces wedmorensis* ATCC No. 21230, were employed.

These micro-organisms were cultivated in a medium (50 ml.) containing 1% polypeptone, 0.3% $K_2HPO_4$, 0.1% $MgSO_4·7HO$ and 0.5% xylan, at 30° C. The medium was agitated after inoculation. After cultivation, the cells were collected by centrifuging and, after washing with water, the collected cells were suspended in water and treated with sonic oscillation for 15 minutes at 10 kc. After said sonic treatment, 20 ml. of supernatant liquid was obtained, and used as an enzyme solution. The activity of the enzyme solution obtained is shown in the following table.

The activity of the enzyme specified in table 1 shows the amount of fructose which was produced when 80 ml. of the 0.1 M glucose solution is reacted with the 20 ml. enzyme solution at 70° C. for 1 hour. Although there are differences in the enzyme activity, each strain which assimilated xylan produced glucose isomerizing enzyme.

EXAMPLE 3

This example illustrates the results of effecting the isomerizing reaction at various pH values using an enzyme solution which was prepared in the manner described in example 1.

The reaction solutions contained 18 g. of glucose, 25 ml. of 0.2 M phosphate buffer solution having various pH values (25 ml. of a 0.1 M glycine-NaOH buffer solution was used only when the pH was 9), 5 ml. of 0.1M $MgSO_4·7H_2O$, and 260 units of an enzyme solution. After the pH of the solutions were adjusted to 5.0, 5.5, 6.0, 6.5, 7.0, 8.0 and 9.0, respectively, the total volume of each was made up to 100 ml. with water, and the solutions maintained at 65° C. for 50 hours. The fructose content of the solutions was analyzed after 20 and 50 hours. The pH of the solutions were maintained by adjustment every 6 hours with NaOH. The results are shown in table 2.

Isomerization resulting from causes other than the enzyme reaction, occur when the reaction pH is alkaline. Table 3 reports the values which are obtained when the fructose produced by the nonenzyme reaction is deducted.

TABLE 2

| Reaction time (hours) | Reaction (pH) | | | | | | |
|---|---|---|---|---|---|---|---|
| | 5.0 | 5.5 | 6.0 | 6.5 | 7.0 | 8.0 | 9.0 |
| 20 | | | 3.5 g. | 5.1 g. | 6.8 g. | 7.1 g. | 7.5 g. |
| 50 | 1.9 g. | 2.7 g. | 5.4 g. | 7.5 g. | 10.0 g. | 9.3 g. | 8.9 g. |

The above values show the amount of fructose formed from glucose.

TABLE 3

| Reaction time (hours) | Reaction (pH) | | | | | | |
|---|---|---|---|---|---|---|---|
| | 5.0 | 5.5 | 6.0 | 6.5 | 7.0 | 8.0 | 9.0 |
| 50 | 1.9 g. | 2.7 g. | 5.4 g. | 6.8 g. | 9.0 g. | 3.9 g. | 2.1 g. |

The above values show the amount of fructose formed from glucose.

EXAMPLE 4

This example illustrates effect of temperature upon the reaction at a pH of 6.8-7.2. The enzyme solution was prepared in the manner described in example 1.

The reaction solutions contained 18.0 g. of glucose, 25 ml. of 0.2 M phosphate buffer solution, 5 ml. of 0.1 M $MgSO_4·7H_2O$, and 433 units of enzyme solution. The volume of the solutions were made up to 100 ml. with water. The reaction was carried out at temperatures of 40° C., 45° C., 0.1 50° C., 60° C., 65° C., 70° C. and 80° C. The pH of the solutions were maintained in the range of 6.8-7.2 by adjustment every 12 hours with NaOH. The fructose content of the solutions were determined at periods of 20 and 40 hours. The results are shown in table 4.

TABLE 1

| Culture | Initial xylan (g./50 ml. of medium) | Remaining xylan (g./50 ml. of medium) | Activity of enzyme (units) | Protein of cell (mg.) | Cultivating time (hrs.) |
|---|---|---|---|---|---|
| St. flavovirens ATCC No. 3320 | 0.25 | 0.20 | 10.0 | 66.4 | 14 |
| St. achromogenus ATCC No. 12767 | 0.25 | 0.16 | 41.2 | 76.8 | 10 |
| St. echinatus ATCC No. 21133 | 0.25 | 0.19 | 32.8 | 82.3 | 22 |
| St. wedmorensis ATCC No. 21230 | 0.25 | 0.07 | 122.8 | 86.4 | 34 |

The results establish that the present enzyme is capable of reacting at unexpectedly high temperatures, which means the present enzyme has superior heat stability. However, the preferred temperature range of the enzyme reaction is between 45° C.–80° C. Reaction at temperature exceeding 80° C. may cause color formation in the syrup due to heat decomposition of the sugar.

TABLE 4

| Reaction time (hours) | Reaction temperature (°C.) | | | | | | |
|---|---|---|---|---|---|---|---|
| | 40 | 45 | 50 | 60 | 65 | 70 | 80 |
| 20 | 2.2 g. | 2.8 g. | 4.0 g. | 6.0 g. | 8.5 g. | 8.6 g. | 8.9 g. |
| 44 | 4.6 g. | 5.5 g. | 7.0 g. | 8.3 g. | 8.9 g. | 8.9 g. | 8.8 g. |

The above values show the amount of fructose formed from glucose.

EXAMPLE 5

Tests were run to determine the effect the reaction on varying the concentration of glucose. The reaction pH was set between 6.8–7.2, and the temperature at 65° C. The glucose solutions tested were at concentrations of 18%, 36%, 50%, 60% and 70% glucose. The composition of the reaction solutions is disclosed in table 5. The enzyme solution was prepared according to the method of example 1. The results are shown in table 6.

From the results reported in table 6, it is seen that the present isomerizing reaction for producing fructose also proceeds when the concentration of glucose in solution is high.

TABLE 5

| | Concentration of glucose, percent | | | | |
|---|---|---|---|---|---|
| | 18 | 36 | 50 | 60 | 70 |
| Glucose (g.) | 18 | 36 | 50 | 60 | 70 |
| 0.2M phosphate buffer solution (ml.) | 20 | 20 | 20 | 20 | 20 |
| 0.1M MgSO$_4$·7H$_2$O (ml.) | 5 | 5 | 5 | 5 | 5 |
| 0.1M CoCl$_2$·6H$_2$O (ml.) | 1 | 1 | 1 | 1 | 1 |
| Enzyme solution (units) | 307 | 307 | 307 | 307 | 307 |
| Reaction volume (ml.) | 100 | 100 | 100 | 100 | 100 |

TABLE 6

| Reaction time (hours) | Concentration of glucose | | | | |
|---|---|---|---|---|---|
| | 18% | 36% | 50% | 60% | 70% |
| 20 | 8.5g | 13.2g | 15.8g | 17.8g | 17.1g |
| 48 | 9.5 | 18.2 | 24.0 | 25.6 | 29.6 |
| 70 | 9.6 | 19.0 | 25.5 | 28.2 | 32.0 |
| 92 | 9.6 | 19.5 | 26.0 | 31.2 | 34.9 |
| Conversion ratio* after 92 hours of reaction | 53.3% | 54.2% | 52.0% | 52.0% | 49.9% |

*Percentage ratio of fructose obtained to initial glucose present.

The values show the amount of fructose formed from glucose.

EXAMPLE 6

A seed medium (50 ml.) containing 1% of xylose, 1% of polypeptone, 0.3% of K$_2$HPO$_4$ and 0.1% of MgSO$_4$·7H$_2$O, was introduced into a Kolbe flask and sterilized. Then, *Streptomyces wedmorensis* ATCC No. 21230 was inoculated into the medium and cultured at 30° C. for 3 days. This culture was then applied as the seed in the present experiment.

The medium for manufacturing the enzyme contained 5% rice bran, 3% corn steep liquor and 0.1% MgSO$_4$·7H$_2$O, and was adjusted to a pH of 7.0. One hundred ml. of the above was then fed into a Kolbe flask of 500 ml. capacity and sterilized. Then it was inoculated with 4 ml. of the aforesaid seed, and cultivated at 30° C. for 30 hours with shaking. Enzyme solution prepared from 50 ml. of this culture had an enzyme activity of 700 units. The cultivated cells were then harvested by centrifugation. The harvested cells were then suspended in water and destroyed by sonic oscillation for 15 minutes at 10 kc. These destroyed cells were centrifuged, and the resulting supernatant liquid was used as the enzyme source. This enzyme solution was reacted with 200 g. of glucose in the same manner as the previous example. 49.5% of the glucose (200 g.) which was used as the substrate for the enzyme, was converted to fructose. After protein removal and purification by the use of activated carbon and ion exchange resin, the above reaction solution was then concentrated to 25% water content. The yield was 195 g. measured as the anhydrous substance.

EXAMPLE 7

This example illustration the use of corn husks and corn cobs as the xylan sources.

The medium (50 ml., pH 7.5) containing 4% corn steep liquor, 0.1% MgSO$_4$·7H$_2$O, 0.025% CoCl$_2$·6H$_2$O, and 3% corn husks, (or 3% corn cobs), which was ground into 115 mesh, was introduced into a Kolbe flask of 200 ml. capacity and sterilized. Then *Streptomyces albus* ATCC No. 21132 was inoculated into the medium and cultured at 30° C. for 48 hours with shaking. The activity of the glucose isomerizing enzymes is shown in table 7.

TABLE 7

| Xylan source | Enzyme activity (units) |
|---|---|
| None | 24.5 |
| Corn husks | 481.0 |
| Corn cobs | 320.5 |

The glucose isomerizing enzymes are produced when corn husks and when corn cobs are used as the xylan source.

The enzyme solution containing 481 units of enzyme activity obtained from the process when corn husks were used as the xylan source, was added to 100 g. of glucose (anhydrous), 50 ml. of 0.2 $M$ phosphate buffer solution (pH 7.5), and 10 ml. of 0.1 $M$ MgSO$_4$·7H$_2$O. The total volume was made up to 200 ml. with water. The mixture was incubated at 70° C. During the reaction, the pH was maintained between 6.8–7.2 with NaOH. After said reaction, protein was removed from the reaction solution, and the solutions purified by the use of activated carbon and ion exchange resin. Said solution was then concentrated to a water content of 25%. The yield obtained from the above process was 98.0 g. of anhydrous substance.

EXAMPLE 8

In this experiment, the hydrol (mother liquor) obtained from the first crystallization of dextrose from starch hydrolysate was used as the substrate for the enzyme.

A medium containing 3% of wheat bran, 4% of corn steep liquor, 0.1% of MgSO$_4$·7H$_2$O, and 0.025% of CoCl$_2$·6H$_2$O, was adjusted to pH 7.0 with NaOH. One hundred ml. of the above was introduced into a Kolbe flask of 500 ml. capacity and sterilized. Then 4 ml. of medium solution (I *Streptomyces albus* ATCC 21132 which was cultured in the seed medium described in example 6 was inoculated into the medium and cultured at 30° C. for 48 hours with shaking. The enzyme solution prepared from 50 ml. of broth had an activity of 760 units. Culture cells in 50 ml. broth were harvested by centrifugation. The cells from the above process were washed and used as the enzyme source.

Hydrol of 87 D.E. was used as the substrate for the isomerization. Enzyme, 0.0025 $M$ Mg(OH)$_2$ and 0.001 $M$ CoCl$_2$·6H$_2$O were added to 100 g. of hydrol and the total volume was made up to 200 ml. with water. The pH was adjusted 7.2. It was then incubated at 70° C. During the reaction, the pH was maintained in the range between 6.8–7.2.

After 50 hours, 45% of the glucose was converted to fructose. After removing the cells from the reaction solution, said reacting solution was purified by the use of activated carbon and ion exchange resin, and concentrated until the water content reached 25%. The composition of the product was 26% fructose, 31.8% glucose, 17.2% oligosaccharide and 25% water.

EXAMPLE 9

A seed medium containing 1% of xylose, 1% of polypeptone, 0.3% of $K_2HPO_4$ and 0.1% of $MgSO_4 \cdot 7H_2O$, was introduced into a Kolbe flask and sterilized. Then *Streptomyces wedmorensis* ATCC No. 21230 was inoculated into the medium and cultivated at 30° C. for 48 hours in order to provide an inoculant. In order to increase cell production, an inoculant from the seed stage was used to inoculate 50 1. (el) of medium and cultivated; this was used to inoculate 500 1. (el) of medium and cultivated, and finally this was used to inoculate 5,000 1. of medium and cultivated. The composition of the media used in the present operation (excluding the seed medium) was 3% wheat bran, 4% corn steep liquor, 0.1% $MgSO_4 \cdot 7H_2O$ and 0.025% $CoCl_2 \cdot 6H_2O$ and water. After this medium had been sterilized, the initial pH was adjusted to 6.5 with NaOH, the cultivation was carried out at 30° C., aeration, one-third volume of broth per minute, and 200 r.p.m. agitation. After 24 hours, enzyme activity reached a maximum. Enzyme solution prepared from 50 ml. of broth had an activity of 750 units.

After completing the foregoing, wheat bran in the broth was removed by the use of a screen sieve. Cells were harvested by the use of filter press to obtain 1,000 kg. of cells. The harvested cells were then suspended in water. The slushy cells were disintegrated by the use of a high-pressure homogenizer. The disintegrated cells were used as the enzyme source.

As a substrate for isomerization, a 92.5 D.E. converted starch syrup in a concentration of 50% (consisting of 87% of glucose and 13% of oligosaccharide containing disaccharide) was used. Fifteen thousand kg. (calculated as solid) of the above converted starch syrup was fed into an isomerizing tank having 30 m.³ capacity. 0.0025 $M$ Mg (OH)$_2$ was added and after the syrup had been heated to 65° C. the enzyme source was added. The pH was maintained in the neighborhood 7.0 with NaOH. The drawing shows the conversions ratio, temperature control and pH control during the isomerization process.

After 90 hours, the conversion ratio reached about 45%. The reaction solution was then purified by the use of activated carbon and ion exchange resin, as in the conventional purification process. The solution was concentrated to a 25% water content. The yield of the manufactured product was 19,600 kg. An analysis of this product showed 29.6% fructose, 36% glucose, 9.4% oligosaccharide containing disaccharide, and 25% water.

EXAMPLE 10

Using the procedure of example 9, seed cultivation, intermediate cultivation and main cultivation were carried out, sequentially.

The medium composition contained 3% wheat bran, 4% corn steep liquor, 0.1% $MgSO_4 \cdot 7H_2O$ and 0.025% $CoCl_2 \cdot 6H_2O$. After the medium had been sterilized, the initial pH of the medium was adjusted to 6.5 with NaOH, and the cultivation was carried out at 30° C., aeration one-third volume of broth per minute, and 200 r.p.m. agitation. After 24 hours, the cell activity reached a maximum. Cells were harvested with a filter press to obtain 900 kg. of the cells. The harvested cells were used as the enzyme source.

As a substrate for isomerization, 97.0 D.E. converted starch syrup in 50% concentration (consisting of 95% glucose and 5% oligosaccharide containing dissaccharide) was used. Fifteen thousand kg. (calculated on the solids basis of solids) of the above converted starch syrup was fed into the isomerizing tank having 30 m.³ capacity. 0.0025 $M$ $MgSO_4 \cdot 7H_2O$ was added, the syrup heated to 65° C. and the enzyme source added. The pH was maintained at about 7.0 with NaOH.

After 100 hours, the conversion ratio was about 47%. The reaction solution was then purified with activated carbon and ion exchange resin, as in conventional purification processes. The final product obtained after concentration of a water content of 25%, was 19,500 kg. Analysis of this product showed 33.4% fructose, 37.7% glucose, 3.9% oligosaccharide containing disaccharide, and 25% water.

It is apparent from the foregoing, that the enzyme process of the present invention is a novel and economical process for converting glucose to fructose and the product is a syrup containing fructose which has a sweetness equivalent to that of invert sugar.

As many embodiments of this invention may be made without departing from the spirit and scope thereof, it is to be understood that the invention includes all such modifications and variations as come within the scope of the appended claims.

We claim:
1. A process for converting glucose into fructose, comprising
    adding to a glucose-containing solution a glucose isomerizing enzyme which has been derived from a micro-organism which is a member of the *Streptomyces* genus and which is characterized as having the ability to assimilate xylan and D-xylose to produce the glucose isomerizing enzyme, and
    maintaining the glucose-containing solution with added enzyme under glucose isomerizing conditions, whereby glucose is converted into fructose.
2. The process, as set forth in claim 1, wherein
    said enzyme was derived from a micro-organism which was cultured on a media containing xylan or D-xylose.
3. The process, as set forth in claim 2, wherein
    said glucose-containing solution containing the added enzyme, is maintained at a temperature between about 45° C. and about 80° C., and at a pH between about 5.5 and about 8.0.
4. The process, as set forth in claim 2, wherein
    said micro-organism is selected from the group consisting of *Streptomyces flavovirens* ATCC No. 3320, *Streptomyces achromogenus* ATCC No. 12767, *Streptomyces echinatus* ATCC No. 21133, *Streptomyces wedmorensis* ATCC No. 21230, and *Streptomyces albus* ATCC No. 21132.
5. The process, as set forth in claim 3, wherein
    said glucose-containing solution comprises hydrol.
6. The process, as set forth in claim 1, wherein
    said micro-organisms is cultivated in a medium containing pure xylan or in a medium containing a xylan-containing material.
7. The process, as set forth in claim 3, wherein
    said micro-organism is selected from the group consisting of *Streptomyces flavovirens* ATCC No. 3320, *Streptomyces achromogenus* ATCC No. 12767, *Streptomyces echinatus* ATCC No. 21133, *Streptomyces wedmorensis* ATCC No. 21230, and *Streptomyces albus* ATCC No. 21132.
8. The process, as set forth in claim 4, wherein
    said micro-organism is cultivated in a medium containing pure xylan or in a medium containing a xylan-containing material.
9. The process, as set forth in claim 2, wherein
    said micro-organism is *Streptomyces flavovirens* ATCC No. 3320.
10. The process, as set forth in claim 2, wherein
    said micro-organism is *Streptomyces achromogenus* ATCC No. 12767
11. The process, as set forth in claim 2, wherein
    said micro-organism is *Streptomyces echinatus* ATCC No. 21133.
12. The process, as set forth in claim 2, wherein
    said micro-organism is *Streptomyces wedmorensis* ATCC No. 21230.
13. The process, as set forth in claim 2, wherein
    said micro-organism is *Streptomyces albus* ATCC No. 21132.